June 3, 1958 F. M. GALLOWAY 2,837,120
DISCHARGE HOSE COMPRISING SUPPORTING MEANS
AND METHOD OF PROVIDING SUCH MEANS
Filed Feb. 19, 1957 2 Sheets-Sheet 1

INVENTOR
FREDERICK M. GALLOWAY
ATTORNEY

June 3, 1958

F. M. GALLOWAY 2,837,120

DISCHARGE HOSE COMPRISING SUPPORTING MEANS
AND METHOD OF PROVIDING SUCH MEANS

Filed Feb. 19, 1957

INVENTOR
FREDERICK M. GALLOWAY
BY
ATTORNEY

United States Patent Office 2,837,120
Patented June 3, 1958

2,837,120

DISCHARGE HOSE COMPRISING SUPPORTING MEANS AND METHOD OF PROVIDING SUCH MEANS

Frederick M. Galloway, Langhorne, Pa., assignor to H. K. Porter Company (Delaware), Philadelphia, Pa., a corporation of Delaware Application February 19, 1957, Serial No. 641,162

6 Claims. (Cl. 138—54)

The present invention relates to discharge hose of the character of that used for conducting fluids such as petroleum and petroleum products as in loading and unloading tanker vessels in port, refueling ships and for generally similar purposes, and is particularly directed to hose of that character embodying means whereby it may conveniently be supported at points intermediate its ends.

In my copending application entitled, Heavy Duty Discharge Hose Splice and Method of Making It, Serial No. 637,397 filed January 31, 1957, I have disclosed a splice whereby a plurality of individual lengths of hose of said character may be united into a single length without the use of metal couplings to thereby form a conduit of considerably greater length than it is practical to manufacture as a single unit, thus affording a single piece of hose of length suitable for service as a discharge hose with coupling members only at its ends. When such discharge hose is in use, for example as in refueling a ship at sea and under way, it is advisable it be supported at one or more points intermediate its ends and it has been a practice to clamp about the hose concavo-convex metal saddles comprising means for attachment thereto of a crane hook or the like to afford such intermediate support.

In accordance with this invention, however, the hose during manufacture is provided with metal bails at longitudinally spaced intervals firmly interlocked with metal saddles embedded in the structure of the hose itself and protected thereby from exposure to the elements.

It is thus a principal object of the invention to provide a discharge hose comprising supporting means integrally embodied therein and forming a unitary part thereof to afford a point of connection for a supporting element.

A further object of the invention is to provide supporting means for a hose of the character aforesaid which may be incorporated in the hose during manufacture.

Other objects, purposes and advantages of the invention will hereafter appear or be understood from the following description of a preferred embodiment of it in which reference will be had to the accompanying drawings illustrating in:

Fig. 1 a fragmentary side elevation of a typical hose in which two supporting elements are incorporated;

Fig. 2 on a larger scale is a perspective view of one of the bail receiving saddles;

Figure 1:
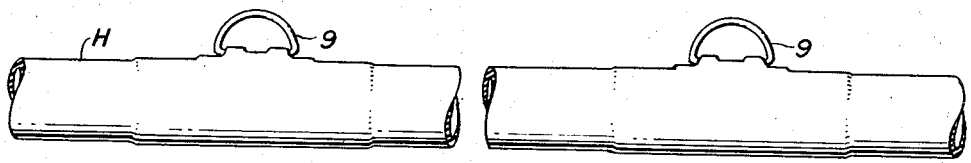
Figure 2:
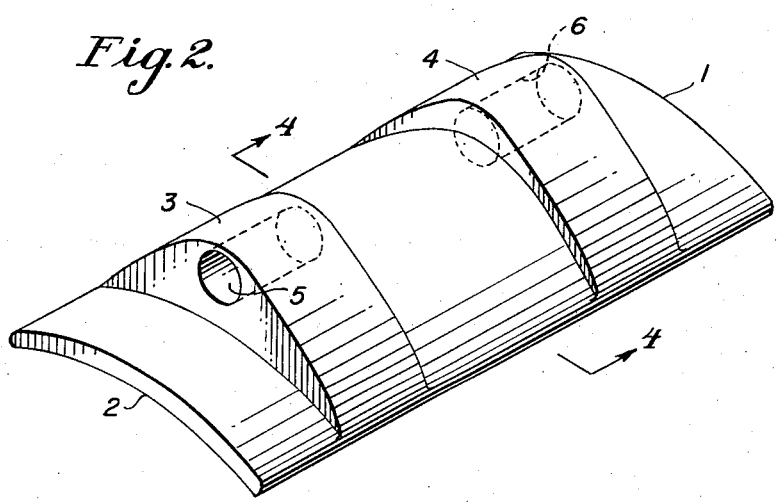
Figure 3:
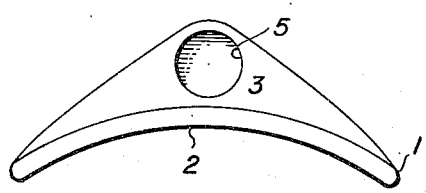
Fig. 3 is an end view of the saddle.
Figure 4:
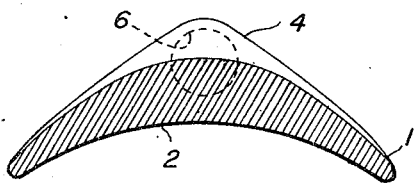
Fig. 4 is a section thereof on line 4—4 in Fig. 2.
Figure 5:
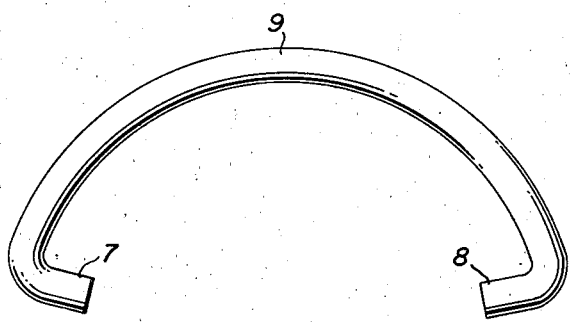
Fig. 5 is a side elevation of a bail before assembly with a saddle such as shown in Figs. 2-4.
Figure 6:
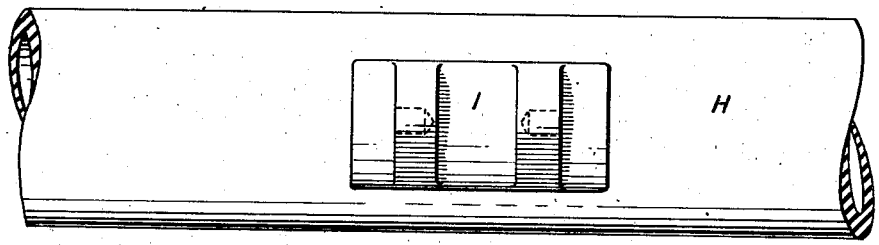
Fig. 6 is a fragmentary top plan view on a smaller scale of a section of hose illustrating one step in the operation of incorporating a saddle in the hose.

Referring now more particularly to the drawings it will be understood the hose H illustrated therein may be of any desired type or kind but in the following description it will be assumed it is a four-inch 6-ply fabric reinforced rubber discharge hose of which considerable quantities are now being manufactured. The ordinary procedure in making hose of this character is initially to wrap a layer of uncured rubber sheet stock about a cylindrical mandrel (not shown) of considerable length as compared to its diameter, for example about 50' by 4" diameter for a nominal 4" hose. Over this inner rubber layer successive plies are then wound spirally about the mandrel, rubber impregnated tire cord, cotton duck or the like being usual materials for this purpose, and a rubber sheet stock outer cover is customarily applied over the outermost ply of impregnated fabric.

In accordance with my invention after the hose has been assembled as aforesaid and preferably before its uncured rubber content has been cured by vulcanization, there are applied to its outer surface at suitably spaced points, for example at 12' intervals, an appropriate number of metal saddles, of which only one, saddle 1, is specifically illustrated in the drawings, being identical with all the others. This saddle, preferably made of brass, comprises a parti-cylindrical concave under face 2 complementary to the outer cylindrical conformation of the hose and a generally correspondingly curved upper convex surface rising from which are upwardly projecting longitudinally spaced bosses 3, 4 between which the main body of the saddle is thicker than outwardly therefrom toward its ends. Each of the bosses provides a socket 5, 6 which respectively extend oppositely inward from the proximate end of the saddle for reception of corresponding ends 7, 8 of a relatively rigid metal bail 9 which, when the ends are inserted in the sockets, can be bent with the aid of suitable tools to seat the ends permanently therein.

Preliminarily to insertion of the bail ends in the saddle sockets, however, the saddle is incorporated in the hose by a procedure now to be described, it being understood, as indicated, that the hose at this time is preferably but not necessarily in a semi-manufactured state, that is, fully built up as to materials, but as yet uncured by vulcanization of its rubber content, and desirably still containing the hollow mandrel on which it was built.

Figure 7:
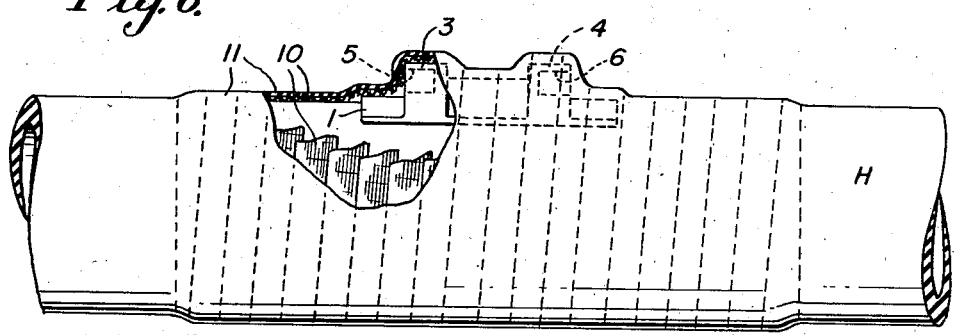
Fig. 7 is a generally corresponding side elevation thereof partly in vertical section following execution of further steps in said operation but prior to introduction of a bail to the sockets provided therefor in the saddle.
Figure 8:
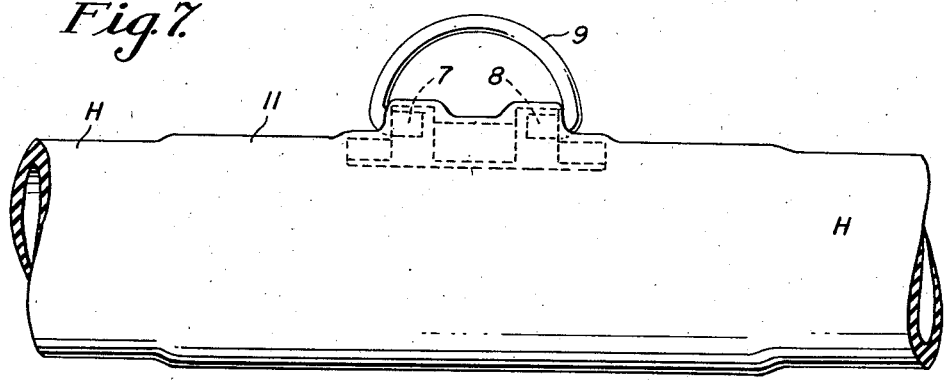
Fig. 8 is a similar view of the hose after a bail has been attached to the saddle incorporated in it.

The saddle is first thoroughly cleaned and also usually sand-blasted to impart a surface texture receptive of a suitable rubber cement or similar adhesive, and preparatory to applying it to the hose its outer surfaces are entirely coated with the adhesive; when the latter has dried to tackiness or beyond the saddle is seated on hose H with its concave under surface 2 registering with and conforming to the outer surface thereof at the point at which the bail is to be disposed. Rubber impregnated textile fabric tape 10 is then tightly wrapped about the hose and saddle, entirely covering the latter and extending beyond its ends, with several layers surrounding the hose and saddle, particularly between the bosses 3, 4 on the latter, thereby firmly incorporating the saddle into the structure of the hose. I prefer to employ for this wrapping tape similar to so-called tire-cord fabric cut into relatively narrow strips and to apply it in successive overlapping spiral layers with the direction of greatest tensile strength in the fabric lying substantially normal to the axis of the hose; for convenience in illustration but one such layer thereof is shown in Fig. 7 of the drawings and its relative thickness is greatly exaggerated therein. Several turns of the tape are carried over and beyond the ends of the saddle to afford a smooth taper on the outer surface of the hose and the entire area is then overlaid with a sheet 11 of uncured rubber which is temporarily held in place by a binding of a plain textile tape (not shown), such as the nylon tape commonly employed for wrapping hose of this character preparatory to vulcanizing.

After the saddles have been disposed individually along the hose at appropriate intervals in the manner just described, manufacture of the hose in the ordinary way is completed, as by tightly wrapping its entire length in more of the said nylon tape, enclosing the wrapped hose in an insulating blanket of asbestos cloth or other suitable material, and then applying vulcanizing heat in any desired manner as by introducing high pressure steam to the interior of the hollow mandrel whereby during the time required for vulcanizing, preferably about 2½ hours, the heat from the steam penetrates through the entire structure of the hose, polymerizing and thereby curing its entire elastomeric content.

After vulcanization and removal of the temporary wrappings of asbestos cloth and nylon tape the vulcanized rubber and fabric covering bail sockets 5, 6 in the saddle bosses are bored out in alignment with the sockets and bail 9 is applied in such manner as to cause its ends 7, 8 to be substantially fully entered in said sockets respectively, thus firmly and permanently securing the bail pivotally to the hose to provide attaching means for a crane hook or the like, or to facilitate its being carried manually. Preferably the holes bored in the fabric reinforced rubber overlying the sockets are just large enough to receive the bail ends in a yielding fairly snug grip and the rubber material thus tends to exclude moisture and other foreign matter from the sockets but without inhibiting the pivotal movement of the bail in the sockets.

It will of course be understood that any suitable number of bails and saddles may be incorporated in a given length of hose, and the bails cannot become separated from the hose under normal or even excessively severe service conditions, the binding tapes used to incorporate the saddles into the hose providing also additional reinforcements for the latter at the points of attachment of the saddles which tend to prevent the hose from buckling or bending so sharply as to restrict its interior passage or injure the hose when a considerable weight thereof is supported from a single bail.

While I have herein illustrated and described with considerable particularity one embodiment of the invention it will be understood I do not desire or intend to be limited or confined thereto in any way as changes in the form, structure and arrangement of the parts of my hose supporting apparatus and in the manner of incorporating into it the hose structure will readily occur to those skilled in the art and may be made if desired without departing from the spirit and scope of the invention as hereinafter claimed.

Having thus described my invention, I claim and desire to protect by Letters Patent of the United States:

1. A multiple-ply elastomer-impregnated fabric reinforced hose comprising a rigid elongated saddle having a concave cylindrical surface between the longitudinal edges conforming to and engaging one ply of the hose, an elastomer-impregnated fabric binding enveloping the saddle and said ply engaging the latter circumferentially between the longitudinal edges of the saddle, the impregnating elastomer of all said fabric being vulcanized, and means projecting from the saddle through said binding and exposed exteriorly thereof for reception of a supporting element.

2. A multiple-ply elastomer-impregnated fabric reinforced hose comprising a rigid saddle having a concave parti-cylindrical surface conforming to and engaging one ply of the hose and outwardly projecting bosses providing spaced sockets generally paralleling the hose axis, an elastomer-impregnated fabric binding enveloping the saddle and said ply, the impregnating elastomer of all said fabric being vulcanized, and a bail having opposed ends entered in said sockets through said binding and its intermediate portion extending arcuately between said ends exteriorly of the hose and binding.

3. A hose as defined in claim 2 in which the impregnated fabric binding is disposed in a plurality of layers and warp yarns of the fabric in each layer extend spirally about the hose and substantially normal to its axis.

4. A hose as defined in claim 2 in which the impregnated fabric binding extends axially beyond the saddle ends and about the hose and an elastomeric cover envelops said binding and merges with said ply of the hose axially beyond the ends of the binding.

5. A saddle for securing a bail to a multiple ply hose comprising a body having a parti-cylindrical surface complementary to the hose and a pair of bosses projecting therefrom in spaced planes normal to the axis thereof each providing a bail receiving socket extending generally parallel to said axis.

6. The method of incorporating supporting means in a multiple-ply elastomer-impregnated fabric reinforced hose which comprises applying to a ply of the hose a saddle having a surface complementary to a portion of said ply and socketed bosses projecting outward therefrom, wrapping elastomer-impregnated fabric strips about the saddle and ply until the saddle is entirely enclosed thereby, vulcanizing the elastomer impregnating said strip wrapping and ply, boring the wrapping in alignment with the saddle sockets, and then entering the ends of a bail respectively oppositely into said sockets.

References Cited in the file of this patent
UNITED STATES PATENTS 2,670,762    Stivason _____ Mar. 2, 1954